Figure 1:
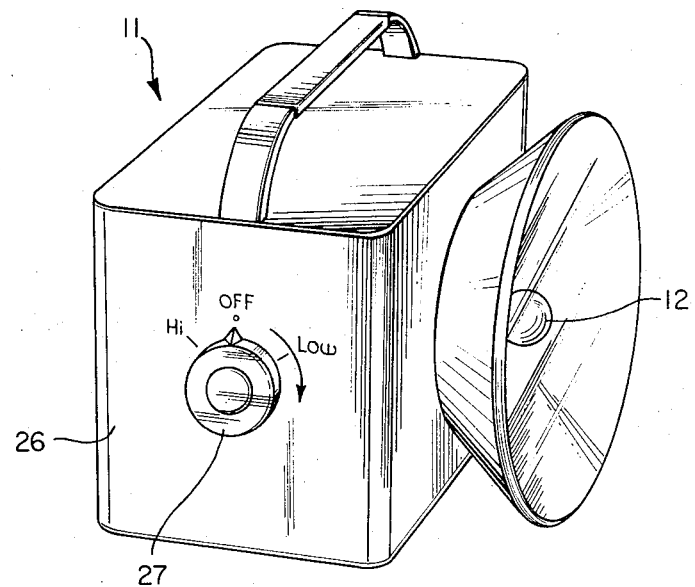

United States Patent [19]
Edelson

[11] 3,800,136
[45] Mar. 26, 1974

[54] VARIABLE INTENSITY BATTERY OPERATED LIGHT

[76] Inventor: Andrew C. Edelson, 10832 Charnock Road, Los Angeles, Calif. 90034

[22] Filed: Sept. 28, 1972

[21] Appl. No.: 293,037

[52] U.S. Cl. .................. 240/10.6 SD, 240/10.6 R
[51] Int. Cl. ............................................. F21l 7/00
[58] Field of Search ................ 240/10.6 R, 10.6 SD

[56] References Cited
UNITED STATES PATENTS
3,201,580    8/1965    Moore............................ 240/10.6 R

OTHER PUBLICATIONS

G. E. Transistor Manual, 1964, pp. 30–31

James Fishbeck, "Build ... Solid–State Slot Car Speed Control", Popular Electronics, December, 1965, pp. 59–61

*Primary Examiner*—Fred L. Braun
*Assistant Examiner*—Russell E. Adams, Jr.

[57]    ABSTRACT

An adjustable light intensity circuit is provided for use with a flashlight, a car or boat light, or any other device or vehicle employing a battery operated light.

1 Claim, 2 Drawing Figures

VARIABLE INTENSITY BATTERY OPERATED LIGHT

BACKGROUND OF THE INVENTION

The present invention relates to battery operated light sources and especially those which are portable or mounted on a vehicle such as a car or boat.

Most battery operated flashlights are equipped with an electrical switch to provide "on" or "off" operation. A single and unadjustable light intensity is thus provided.

It would be more convenient and practical to be able to adjust the illumination of a flashlight to increase its flexibility and usefulness. For example, the use of a standard flashlight in sleeping quarters is likely to disturb a sleeping person. However, a variable intensity flashlight would be adjustable to a minimum light level allowing the user adequate search light without disturbing the sleeping occupant.

Such a diminished light level would also be useful in checking on a sleeping child, a sick person, and others whose sleep must not be interrupted.

It is apparent that the usefulness of such a device is unlimited. A variable intensity camping lantern has obvious advantages. The lantern could be used in the tent as a night light without disturbing the sleep of others. Also, it could be used as a reading lamp because it is adjustable to a low localized and personal use level.

Similar advantages would be realized from variable level light sources carried or mounted on vehicles such as cars, boats, trains, airplanes, etc. For example, cars are typically equipped with a passenger compartment light. If this light could be varied in intensity, its usefulness would be enhanced. For example, maps could be read in the front driver's seat under an attenuated light without disturbing the sleep of children in the back seat.

SUMMARY:

Accordingly, it is an object of the present invention to satisfy the need for a variable intensity battery operated light, especially portable flashlights and vehicle mounted lights.

It will be apparent that the means for providing this variable attenuation cannot be complex, expensive to manufacture, difficult to repair, easily worn out or damaged, as these shortcomings would render the product wholly impractical. It is therefore another object of the present invention to provide such a variable intensity battery operated light which is simple, very reliable, long lasting, and easily mass manufactured.

These objects are achieved in the present embodiment of the invention by an adjustable light intensity circuit for use with a battery operated light. The circuit includes a voltage divider, such as a simple potentiometer, connected across the battery and providing at its wiper arm a variable direct current voltage. A semiconductor control means, here in the form of a transistor, is connected in series with a light bulb across the battery and with a control electrode connected to the wiper arm of the potentiometer. By this arrangement, the transistor is responsive to the voltage applied to its control electrode by the variable potentiometer to vary the current flow through the light bulb thus varying the light intensity thereof.

The potentiometer and transistor forming this circuit may be easily mounted on or in a flashlight, lantern or vehicular light source for convenient manual control of the adjustable potentiometer.

It is a feature of this embodiment of the present invention that the lower light intensity settings afford longer battery life. At the lower intensities, less current is drawn from the battery and thus if the attenuated light is adequate, the lantern battery will last longer at this level. A flashlight or lantern equipped with the variable intensity circuit thus becomes useful as a night light which may be left on for long periods without rapidly wearing out the battery source.

These and further objects and various advantages of the variable intensity battery operated light source will become apparent to those skilled in the art from a consideration of the following description of one exemplary embodiment thereof.

Figure 2:
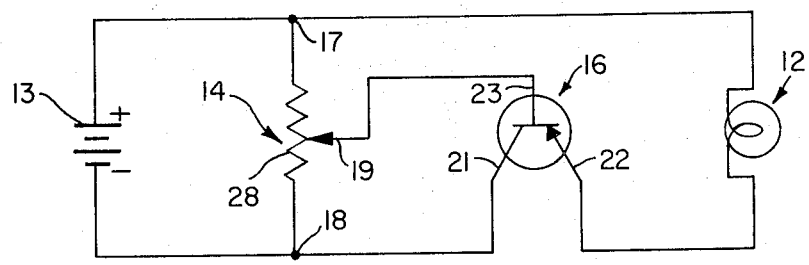

Reference will be made to the appended sheet of drawings in which:

FIG. 1 is a perspective view of a lantern equipped with the variable light intensity circuit of the present embodiment; and FIG. 2 is a detailed schematic diagram of the variable intensity circuit used in the lamp of FIG. 1.

DESCRIPTION:

As indicated, the present embodiment of the invention is adapted for use with a battery operated light, such as a portable flashlight or lantern 11. It is also useful for battery operated lights or lamps carried by vehicles, such as car, boat, aircraft, train, etc. lights. In general, all that is required is a light bulb 12 and a battery 13 for use with the variable light intensity circuit of the present embodiment.

With reference to FIG. 2, this circuit may include a potentiometer 14 and a transistor 16.

Potentiometer 14 is adapted to have its outside terminals 17 and 18 connected across the positive and negative terminals, respectively, of battery 13 as illustrated. Arranged in this way, potentiometer 14 serves as a voltage divider means for supplying a variable direct current voltage at a wiper arm 19. This voltage may vary between a potential existing at the negative terminal of battery 13, when wiper arm 19 is adjacent potentiometer terminal 18, to a potential at the positive battery terminal when wiper arm 19 is adjacent potentiometer terminal 17.

Transistor 16, here a PNP transistor, is adapted to be connected with its emitter-collector circuit in series with a bulb 12 across the terminals of battery 13. For this purpose, a collector electrode 21 is connected to the negative terminal of battery 13, jointly with terminal 18 of potentiometer 14. The transistor's emitter electrode 22 is connected through the filament of bulb 12 to the positive terminal of battery 13 to which terminal 17 of the potentiometer 14 is also connected. To control the electrical operation of transistor 16, its base electrode 23 is jointed to wiper arm 19 of the potentiometer.

By this arrangement, transistor 16 serves as a semiconductor control means in which the collector-emitter circuit functions as a variable resistance in series with light bulb 12. The resistance of this circuit is varied by the voltage applied to its control element, here in the form of base electrode 23. This voltage is in turn set or determined by potentiometer 14 at wiper arm 19 thereof. As the resistance of the emitter-collector circuit is varied by adjusting wiper arm 19, the amount of current flow through bulb 12 varies as does its light emitting intensity.

As transistor 16 is here of a PNP type, the current associated with collector electrode 21 increases as does the intensity of bulb 12 as wiper arm 19 is adjusted toward the negative side of the battery, here at potentiometer terminal 18. Associated with this increased current flow is a drop in the emitter-collector resistance between electrodes 22 and 21 and a responsive increase in the current through bulb 12.

On the other hand, by rotating wiper arm 19 toward the positive side of battery 13, the base bias voltage at electrode 23 is reduced until negligible current flows to the transistor collector electrode 21. In this mode, the emitter-collector resistance of the transistor is very high and thus negligible current is flowing through bulb 12 and is is virtually turned off.

Transistor 16 and potentiometer 14 as indicated may be conveniently mounted within a battery housing 26 of lantern 11. Wiper arm 19 of potentiometer 14 may be provided with a control knob 27 extending exteriorly of housing 26 for easy manual adjustment. An "off" position may be indicated adjacent knob 27, corresponding to the rotation of wiper arm 19 fully toward the positive side of the battery at potentiometer terminal 17. From this position, the light may be increased by a clockwise rotation toward a "Hi" level, corresponding to wiper arm 19 being positioned at the negative side of battery 13 at terminal 18. In the "Hi" position, the lamp is virtually turned "on."

Although transistor 16 providing the semi-conductor control means is here in the form of a PNP transistor, it may be replaced by an opposite polarity type transistor, namely an NPN transistor, by merely reversing the polarity of battery 13.

As the amount of operating current required by base electrode 23 of the transistor is extremely minute, potentiometer 14 need only supply a very small amount of electrical power to wiper arm 19. Thus, the resistive element 28 of potentiometer 14 may be selected to have a very substantial resistance so as to reduce the amount of power drain on battery 13 to a negligible level. Accordingly, when wiper arm 19 is adjusted to turn "off" transistor 16 and light bulb 12, all of the circuit paths connected across battery 13 are of a very high resistance and no continual power drain is exhibited. Because of this and also because the drain on the battery is minimized when using low light output settings, the life of the battery is extended.

Also, since transistor 16 is a solid state device, it does not require operating current when it has been turned "off," as does a simple rheostat.

Although the present embodiment of the invention has been illustrated in the form of a lantern 11, it will be appreciated that the use of the variable intensity circuit for many different types and varieties of battery operated lights is contemplated. Also, since numerous changes can be made in the described embodiment of the invention and other embodiments can be realized without departing from the scope of the invention, it is intended that the foregoing descriptive material and accompanying drawings shall be interpreted as illustrative and not in a limiting sense.

I claim:

1. A portable flashlight comprising a casing having a battery therein, and a light bulb supported by the casing and in series with the battery, and semi-conductor impedance means variable from a low impedance to a high impedance for controlling the amount of current flowing through said light bulb in order to control the brightness thereof carried by said casing, said semi-conductor impedance means consisting of a transistor having an emitter and collector in series with said battery and said light bulb, a variable resistance potentiometer having the ends thereof connected to said battery and having a movable center tap, and means connecting said center tap to the base of said transistor, whereby to vary the current flowing from said battery through said light bulb in a range from substantially zero to a maximum.

* * * * *